United States Patent
Chen et al.

(10) Patent No.: US 7,796,200 B2
(45) Date of Patent: Sep. 14, 2010

(54) SWITCHABLE TWO DIMENSIONAL/THREE DIMENSIONAL DISPLAY

(75) Inventors: Chao-Yuan Chen, Hsinchu County (TW); Geng-Yu Liu, Miaoli County (TW); Jenn-Jia Su, Chiayi County (TW); Ting-Jui Chang, Taipei (TW)

(73) Assignee: AU Optronics Corporation, Hsinchu (TW)

( * ) Notice: Subject to any disclaimer, the term of this patent is extended or adjusted under 35 U.S.C. 154(b) by 154 days.

(21) Appl. No.: 12/315,658

(22) Filed: Dec. 5, 2008

(65) Prior Publication Data
US 2010/0091204 A1 Apr. 15, 2010

(30) Foreign Application Priority Data
Oct. 9, 2008 (TW) .............................. 97138952 A

(51) Int. Cl.
G02F 1/1333 (2006.01)
G02F 1/1337 (2006.01)
G02F 1/1341 (2006.01)

(52) U.S. Cl. ..................... 349/15; 349/117; 349/124
(58) Field of Classification Search ............. 359/53, 359/64; 349/15, 75, 84, 96, 117, 124, 128, 349/129, 136
See application file for complete search history.

(56) References Cited
U.S. PATENT DOCUMENTS

| | | | | |
|---|---|---|---|---|
| 5,122,887 A | * | 6/1992 | Mathewson | ................. 349/80 |
| 5,859,682 A | * | 1/1999 | Kim et al. | ................... 349/124 |
| 5,945,965 A | | 8/1999 | Inoguchi et al. | |
| 6,055,013 A | | 4/2000 | Woodgate et al. | |
| 7,199,845 B2 | | 4/2007 | Koyama et al. | |
| 2004/0095534 A1 | * | 5/2004 | Wu | ........................... 349/117 |
| 2007/0177086 A1 | * | 8/2007 | Ishitani et al. | ............. 349/117 |
| 2007/0200977 A1 | * | 8/2007 | Egi et al. | ...................... 349/96 |
| 2010/0020271 A1 | * | 1/2010 | Lin et al. | ..................... 349/75 |

FOREIGN PATENT DOCUMENTS

TW 200403937 3/2004

* cited by examiner

*Primary Examiner*—Akm E Ullah
(74) *Attorney, Agent, or Firm*—J.C. Patents

(57) ABSTRACT

A switchable 2D/3D display includes a liquid crystal display (LCD) panel and a switchable barrier. The LCD panel includes a first substrate, a second substrate, a first twisted nematic (TN) liquid crystal layer, a first wide-view film set including a first wide-view film and a second wide-view film, and a first polarizer set. The first polarizer set includes a first polarizer and a second polarizer. Transmission axes of the first and second polarizers are substantially perpendicular to each other. The switchable barrier includes a third substrate, a fourth substrate, a second TN liquid crystal layer, a second wide-view film set including a third wide-view film and a fourth wide-view film, and a second polarizer set. The second polarizer set includes a third polarizer and a fourth polarizer. Transmission axes of the third and fourth polarizers are substantially perpendicular to each other.

9 Claims, 4 Drawing Sheets

SWITCHABLE TWO DIMENSIONAL/THREE DIMENSIONAL DISPLAY

CROSS-REFERENCE TO RELATED APPLICATION

This application claims the priority benefit of Taiwan application serial no. 97138952, filed Oct. 9, 2008. The entirety of the above-mentioned patent application is hereby incorporated by reference herein and made a part of this specification.

BACKGROUND OF THE INVENTION

1. Field of the Invention

The present invention relates to a switchable two dimensional/three dimensional display (2D/3D display), and more particularly to a switchable 2D/3D display equipped with a switchable barrier.

2. Description of Related Art

In recent years, continuous advancement of display technologies results in increasing demands on display quality of displays, such as image resolution, color saturation, and so on. Nevertheless, in process of purchasing a display, whether the display is able to display 3D images or not is also taken into consideration in addition to high image resolution and high color saturation.

In current 3D image display technologies, a fixed barrier is mainly utilized for controlling images captured in respective eyes of a viewer. However, according to visual characteristics of human eyes, when two images with the same content but different parallax are respectively captured by a viewer's left and right eyes, two images that seem to be overlapped may be interpreted as a 3D image. Based on different positions of a barrier, the 3D image display technologies can be approximately categorized into a front barrier 3D image display technology and a back barrier 3D image display technology.

It should be noted that a 3D image is produced by the fixed barrier in a spatial-multiplexed manner, such that the resolution of a 3D display device is reduced in half even though a 3D display effect of a liquid crystal display (LCD) panel can be achieved. Besides, the 3D display equipped with the fixed barrier cannot display 2D images but 3D images. Thus, the 3D display having the fixed barrier cannot be extensively applied.

To resolve said issue, a switchable barrier has been proposed and applied in a switchable 2D/3D display such that the switchable 2D/3D display is able to display 2D images when the switchable barrier is turned off. By contrast, when the switchable barrier is turned on, the switchable 2D/3D display is able to display 3D images. Specifically, in a conventional switchable 2D/3D display, if the LCD panel is a twisted nematic (TN) LCD panel, a normally white mode TN-LC cell is usually used as the switchable barrier, and the TN LCD panel and liquid crystals in the TN-LC cell have the same chirality. Nonetheless, the switchable 2D/3D display having the aforesaid structure can still be improved in terms of display quality, such as contrast, symmetrical viewing angles, and so on.

SUMMARY OF THE INVENTION

The present invention is directed to a switchable 2D/3D display characterized by favorable display quality.

In the present invention, a switchable 2D/3D display including an LCD panel and a switchable barrier is provided. The LCD panel includes a first substrate, a second substrate opposite to the first substrate, a first twisted nematic (TN) liquid crystal layer, a first wide-view film set, and a first polarizer set. The first TN liquid crystal layer is disposed between the first substrate and the second substrate. The first wide-view film set includes a first wide-view film and a second wide-view film. The first wide-view film is disposed on an outer surface of the first substrate, and the second wide-view film is disposed on an outer surface of the second substrate. Besides, the first polarizer set includes a first polarizer and a second polarizer. The first polarizer set is disposed on the first wide-view film set, such that the first wide-view film is disposed between the first polarizer and the first substrate, and the second wide-view film is disposed between the second polarizer and the second substrate. A transmission axis of the first polarizer and a transmission axis of the second polarizer are substantially perpendicular to each other. The switchable barrier includes a third substrate, a fourth substrate opposite to the third substrate, a second TN liquid crystal layer, a second wide-view film set, and a second polarizer set. The second TN liquid crystal layer is disposed between the third substrate and the fourth substrate. Here, the second TN liquid crystal layer and the first TN liquid crystal layer have opposite chiralities. The second wide-view film set includes a third wide-view film and a fourth wide-view film. The third wide-view film is disposed on an outer surface of the third substrate, and the fourth wide-view film is disposed on an outer surface of the fourth substrate. The second polarizer set includes a third polarizer and a fourth polarizer. Besides, the second polarizer set is disposed on the second wide-view film set, such that the third wide-view film is disposed between the third polarizer and the third substrate, and the fourth wide-view film is disposed between the fourth polarizer and the fourth substrate. A transmission axis of the third polarizer and a transmission axis of the fourth polarizer are substantially perpendicular to each other.

In an embodiment of the present invention, the LCD panel further includes a first alignment film set. The first alignment film set includes a first alignment film and a second alignment film. The first alignment film is disposed on an inner surface of the first substrate and located between the first substrate and the first TN liquid crystal layer. The second alignment film is disposed on an inner surface of the second substrate and located between the second substrate and the first TN liquid crystal layer. A rubbing direction of the first alignment film and a rubbing direction of the second alignment film are substantially perpendicular to each other.

In an embodiment of the present invention, the rubbing direction of the first alignment film in the LCD panel is substantially perpendicular to the transmission axis of the first polarizer, or the rubbing direction of the second alignment film in the LCD panel is substantially perpendicular to the transmission axis of the second polarizer.

In an embodiment of the present invention, the switchable barrier further includes a second alignment film set having a third alignment film and a fourth alignment film. The third alignment film is disposed on an inner surface of the third substrate and located between the third substrate and the second TN liquid crystal layer. The fourth alignment film is disposed on an inner surface of the fourth substrate and located between the fourth substrate and the second TN liquid crystal layer. A rubbing direction of the third alignment film and a rubbing direction of the fourth alignment film are substantially perpendicular to each other.

In an embodiment of the present invention, the rubbing direction of the third alignment film in the switchable barrier is substantially perpendicular to the transmission axis of the third polarizer, or the rubbing direction of the fourth alignment film in the switchable barrier is substantially perpendicular to the transmission axis of the fourth polarizer.

In an embodiment of the present invention, the transmission axis of the second polarizer and the transmission axis of the third polarizer are substantially parallel to each other.

In an embodiment of the present invention, the transmission axis of the fourth polarizer and the transmission axis of the first polarizer are substantially parallel to each other.

In an embodiment of the present invention, a rubbing direction of the second alignment film and a rubbing direction of the third alignment film are substantially parallel to each other.

In an embodiment of the present invention, a rubbing direction of the fourth alignment film and a rubbing direction of the first alignment film are substantially parallel to each other.

According to the present invention, the TN liquid crystal layer in the switchable barrier and the TN liquid crystal layer in the LCD panel have opposite chiralities. Therefore, the switchable 2D/3D display of the present invention has favorable display quality.

In order to make the aforementioned and other features and advantages of the present invention more comprehensible, several embodiments accompanied with figures are described in detail below.

DESCRIPTION OF EMBODIMENTS

Figure 1:
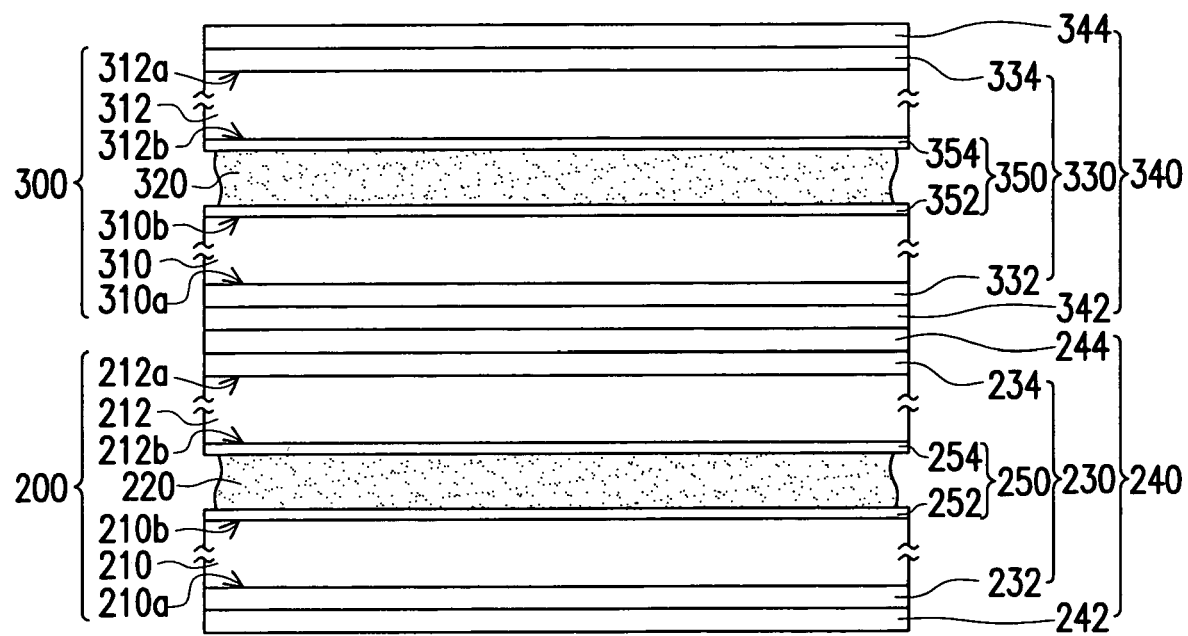
FIG. 1 is a schematic view of a switchable 2D/3D display according to an embodiment of the present invention.

FIG. 1 is a schematic view of a switchable 2D/3D display according to an embodiment of the present invention. Referring to FIG. 1, a switchable 2D/3D display 100 of the present embodiment includes an LCD panel 200 and a switchable barrier 300. The LCD panel 200 includes a first substrate 210, a second substrate 212 opposite to the first substrate 210, a first twisted nematic (TN) liquid crystal layer 220, a first wide-view film set 230, and a first polarizer set 240. The first TN liquid crystal layer 220 is disposed between the first substrate 210 and the second substrate 212. The first wide-view film set 230 includes a first wide-view film 232 and a second wide-view film 234. The first wide-view film 232 is disposed on an outer surface 210a of the first substrate 210, and the second wide-view film 234 is disposed on an outer surface 212a of the second substrate 212. Besides, the first polarizer set 240 includes a first polarizer 242 and a second polarizer 244. The first polarizer set 240 is disposed on the first wide-view film set 230. In detail, the first wide-view film 232 is located between the first polarizer 242 and the first substrate 210, and the second wide-view film 234 is disposed between the second polarizer 244 and the second substrate 212. A transmission axis of the first polarizer 242 and a transmission axis of the second polarizer 244 are substantially perpendicular to each other. The switchable barrier 300 includes a third substrate 310, a fourth substrate 312 opposite to the third substrate 310, a second TN liquid crystal layer 320, a second wide-view film set 330, and a second polarizer set 340. The second TN liquid crystal layer 320 is disposed between the third substrate 310 and the fourth substrate 312. Here, the second TN liquid crystal layer 320 and the first TN liquid crystal layer 220 have substantially opposite chiralities. The second wide-view film set 330 includes a third wide-view film 332 and a fourth wide-view film 334. The third wide-view film 332 is disposed on an outer surface 310a of the third substrate 310, and the fourth wide-view film 334 is disposed on an outer surface 312a of the fourth substrate 312. The second polarizer set 340 includes a third polarizer 342 and a fourth polarizer 344. Besides, the second polarizer set 340 is disposed on the second wide-view film set 330. In detail, the third wide-view film 332 is located between the third polarizer 342 and the third substrate 310, and the fourth wide-view film 334 is disposed between the fourth polarizer 344 and the fourth substrate 312. A transmission axis of the third polarizer 342 and a transmission axis of the fourth polarizer 344 are substantially perpendicular to each other. FIG. 1 illustrates an embodiment in which the switchable barrier 300 is disposed on the LCD panel 200. Nevertheless, the present invention should not be construed as limited to the embodiment set forth herein. Namely, the switchable barrier 300 can also be disposed under the LCD panel 200, whereby same effects as are achieved in the previous embodiment can also be accomplished. Particularly, the LCD panel 200 can be disposed between the switchable barrier 300 and a backlight module (not shown), so as to form a front barrier 3D display. Besides, the switchable barrier 300 can also be disposed between the LCD panel 200 and a backlight module (not shown), so as to form a back barrier 3D display.

In the present embodiment, the switchable barrier 300 is, for example, a normally white mode TN-LC cell. When the switchable barrier 300 is turned off, 2D images displayed on the LCD panel 200 can be directly observed by a user. On the contrary, when the switchable barrier 300 is turned on, 3D images can be observed by the user.

Referring to FIG. 1, the LCD panel 200 of the present embodiment selectively includes a first alignment film set 250. The first alignment film set 250 includes a first alignment film 252 and a second alignment film 254. The first alignment film 252 is disposed on an inner surface 210b of the first substrate 210 and located between the first substrate 210 and the first TN liquid crystal layer 220. The second alignment film 254 is disposed on an inner surface 212b of the second substrate 212 and located between the second substrate 212 and the first TN liquid crystal layer 220. The disposition of the first alignment film 252 and the second alignment film 254 allows liquid crystal molecules in the first TN liquid crystal layer 220 to be pre-tilted at a certain angle and arranged in a specific rubbing direction. When the liquid crystal molecules in the first TN liquid crystal layer 220 are designed to have a specific pre-tilt angle and a specific rubbing direction by the first alignment film 252 and the second alignment film 254, the LCD panel 200 is able to achieve favorable display effects. For instance, the LCD panel 200 can have a relatively wide viewing angle. It should be noted that a rubbing direction of the first alignment film 252 and a rubbing direction of the second alignment film 254 are substantially perpendicular to each other in the present embodiment.

On the other hand, the switchable barrier 300 of the present embodiment selectively includes a second alignment film set 350. The second alignment film set 350 includes a third alignment film 352 and a fourth alignment film 354. The third alignment film 352 is disposed on an inner surface 310b of the third substrate 310 and located between the third substrate 310 and the second TN liquid crystal layer 320. The fourth alignment film 354 is disposed on an inner surface 312b of the fourth substrate 312 and located between the fourth substrate 312 and the second TN liquid crystal layer 320. Note that a rubbing direction of the third alignment film 352 and a rubbing direction of the fourth alignment film 354 are substantially perpendicular to each other.

Figure 2A:
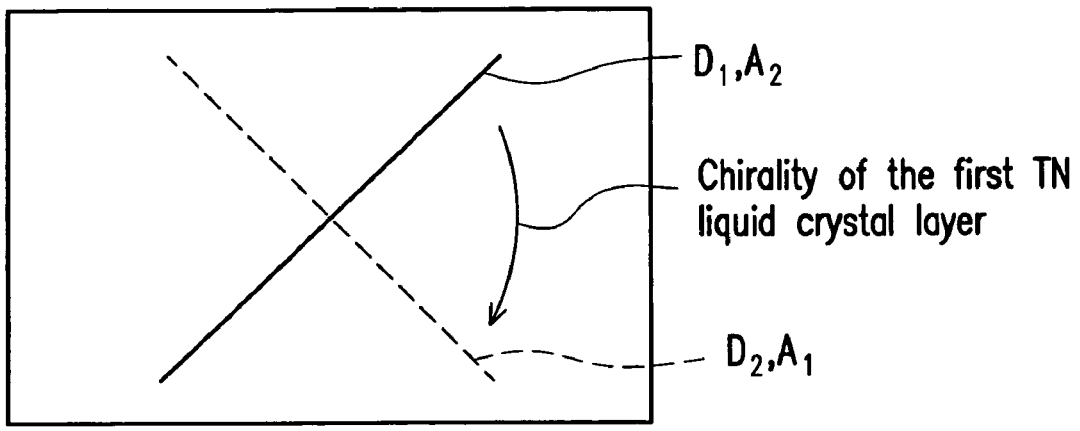
FIG. 2A is a schematic view illustrating relative positions of rubbing directions of alignment films and transmission axes of polarizers in an LCD panel.

FIG. 2A is a schematic view illustrating relative positions of rubbing directions of alignment films and transmission axes of polarizers in an LCD panel. In an embodiment of the present invention, a rubbing direction $D_1$ of the first alignment film 252 in the LCD panel 200 can be substantially perpendicular to a transmission axis $A_1$ of the first polarizer 242. According to another embodiment of the present invention, a rubbing direction $D_2$ of the second alignment film 254 can be substantially perpendicular to a transmission axis $A_2$ of the second polarizer 244. It should be mentioned that the switchable 2D/3D display 100 is able to achieve favorable display effects when the rubbing direction $D_1$ of the first alignment film 252 is substantially perpendicular to the transmission axis $A_1$ of the first polarizer 242 and when the rubbing direction $D_2$ of the second alignment film 254 is substantially perpendicular to the transmission axis $A_2$ of the second polarizer 244.

Figure 2B:
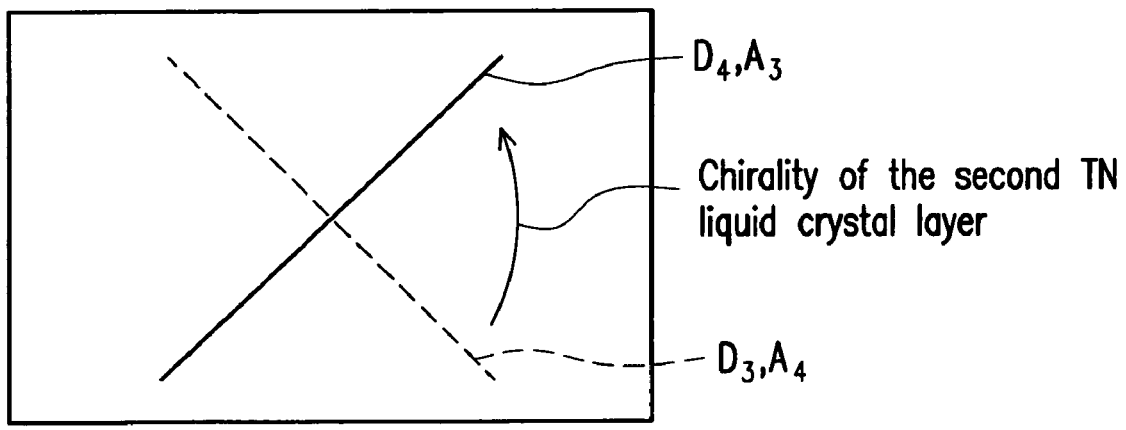
FIG. 2B is a schematic view illustrating relative positions of rubbing directions of alignment films and transmission axes of polarizers in a switchable barrier.

FIG. 2B is a schematic view illustrating relative positions of rubbing directions of alignment films and transmission axes of polarizers in a switchable barrier. In an embodiment of the present invention, a rubbing direction $D_3$ of the third alignment film 352 in the switchable barrier 300 can be substantially perpendicular to a transmission axis $A_3$ of the third polarizer 342. According to another embodiment of the present invention, a rubbing direction $D_4$ of the fourth alignment film 354 can be substantially perpendicular to a transmission axis $A_4$ of the fourth polarizer 344. It should be mentioned that the switchable 2D/3D display 100 is able to achieve favorable display effects when the rubbing direction $D_3$ of the third alignment film 352 is substantially perpendicular to the transmission axis $A_3$ of the third polarizer 342 and when the rubbing direction $D_4$ of the fourth alignment film 354 is substantially perpendicular to the transmission axis $A_4$ of the fourth polarizer 344. Further preferably, given that the conditions depicted in FIGS. 2A and 2B are both satisfied, the switchable 2D/3D display 100 can perform the display function to a better extent. As for chiralities of the first TN liquid crystal layer 220 and the second TN liquid crystal layer 320 in the previous embodiments, the first TN liquid crystal layer 220 rotates by 90 degrees in a clockwise direction, and the second TN liquid crystal layer 320 rotates by 90 degrees in a counter-clockwise direction, for example. Thereby, the first TN liquid crystal layer 220 and the second TN liquid crystal layer 320 have substantially opposite chiralities.

In still another embodiment of the present invention, the transmission axis $A_2$ of the second polarizer 244 and the transmission axis $A_3$ of the third polarizer 342 can be substantially parallel to each other. That is to say, the transmission axis $A_4$ of the fourth polarizer 344 can be substantially perpendicular to the transmission axis $A_2$ of the second polarizer 244.

In yet still another embodiment of the present invention, the transmission axis $A_4$ of the fourth polarizer 344 and the transmission axis $A_1$ of the first polarizer 242 can be substantially parallel to each other. Note that the switchable 2D/3D display 100 achieves favorable display effects when the transmission axis $A_2$ of the second polarizer 244 is substantially parallel to the transmission axis $A_3$ of the third polarizer 342 and when the transmission axis $A_4$ of the fourth polarizer 344 is substantially parallel to the transmission axis $A_1$ of the first polarizer 242.

In another embodiment of the present invention, the rubbing direction $D_2$ of the second alignment film 254 and the rubbing direction $D_3$ of the third alignment film 352 can be substantially parallel to each other. Namely, the rubbing direction $D_2$ of the second alignment film 254 differs from the rubbing direction $D_3$ of the third alignment film 352 by about 0° or about 180°. To be more specific, when a starting point and an end point of the rubbing direction $D_2$ of the second alignment film 254 are substantially identical to a starting point and an end point of the rubbing direction $D_3$ of the third alignment film 352, the rubbing direction $D_2$ of the second alignment film 254 differs from the rubbing direction $D_3$ of the third alignment film 352 by about 0°. On the contrary, when the starting point of the rubbing direction $D_2$ of the second alignment film 254 is the end point of the rubbing direction $D_3$ of the third alignment film 352, the rubbing direction $D_2$ of the second alignment film 254 differs from the rubbing direction $D_3$ of the third alignment film 352 by about 180°.

In still another embodiment of the present invention, the rubbing direction $D_4$ of the fourth alignment film 354 and the rubbing direction $D_1$ of the first alignment film 252 can be substantially parallel to each other. In other words, the rubbing direction $D_4$ of the fourth alignment film 354 differs from the rubbing direction $D_1$ of the first alignment film 252 by about 0° or about 180°. Further preferably, the rubbing direction $D_2$ of the second alignment film 254 and the rubbing direction $D_3$ of the third alignment film 352 are substantially parallel to each other. In the meantime, the rubbing direction $D_4$ of the fourth alignment film 354 and the rubbing direction $D_1$ of the first alignment film 252 are substantially parallel to each other.

Figure 3:
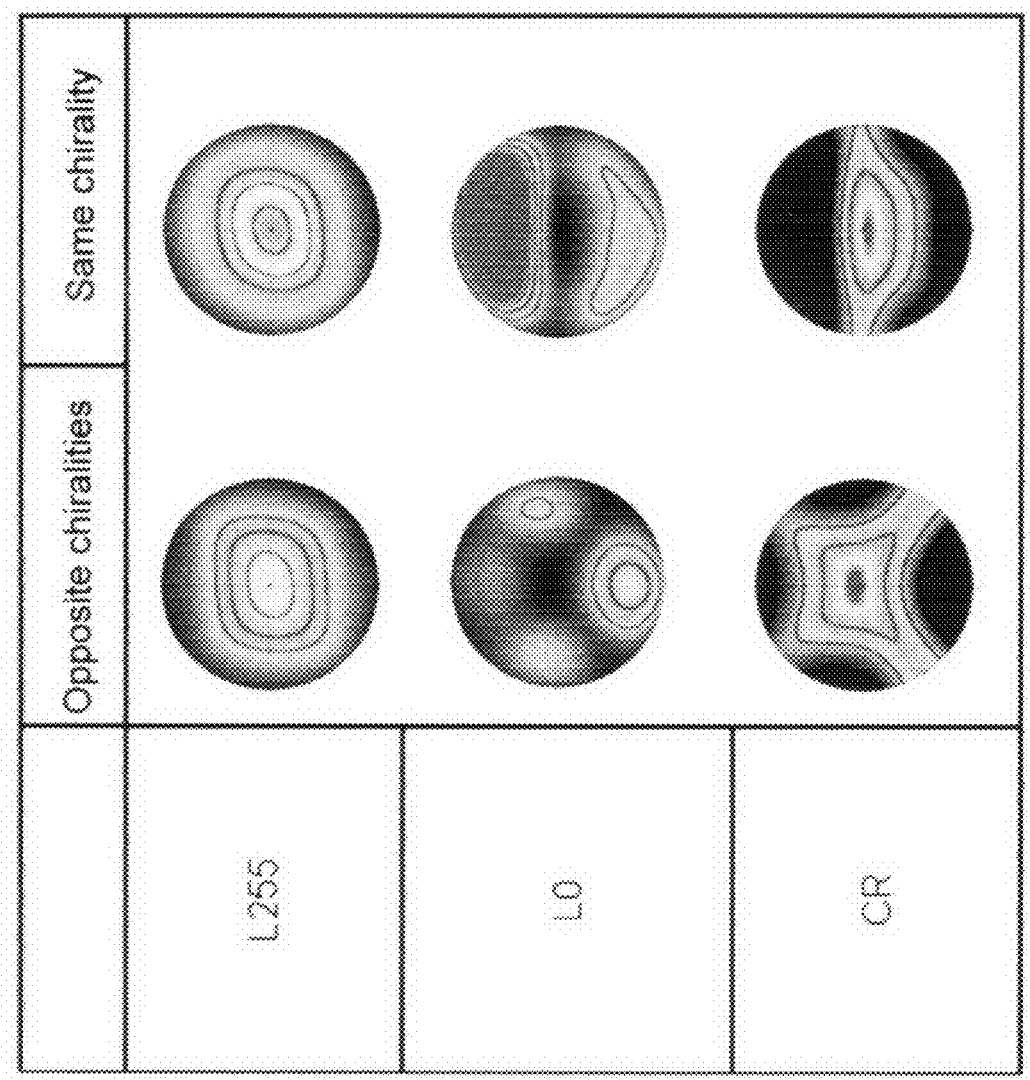
FIG. 3 is a schematic view illustrating results of an optical simulation on a first TN liquid crystal layer and a second TN liquid crystal layer which have the same chirality or opposite chiralities.

FIG. 3 is a schematic view illustrating results of an optical simulation on a first TN liquid crystal layer and a second TN liquid crystal layer which have the same chirality or opposite chiralities. Referring to FIGS. 1 and 3, given that the first TN liquid crystal layer 220 and the second TN liquid crystal layer 320 have substantially opposite chiralities, simulation results are shown at the left side in FIG. 3 when 255 gray scale (L255) and 0 gray scale (L0) are displayed by the switchable 2D/3D display 100. By contrast, given that the first TN liquid crystal layer 220 and the second TN liquid crystal layer 320 have the same chirality, simulation results are shown at the right side in FIG. 3 when the 255 gray scale (L255) and 0 gray scale (L0) are displayed by the switchable 2D/3D display 100. As the first TN liquid crystal layer 220 and the second TN liquid crystal layer 320 have substantially opposite chiralities, it can be deduced from the simulation results indicated in FIG. 3 that not only contrast ratio (CR) of images displayed on the switchable 2D/3D display 100 is better, but also the symmetry of view angle of images displayed on the switchable 2D/3D display 100 is better.

Figure 4:
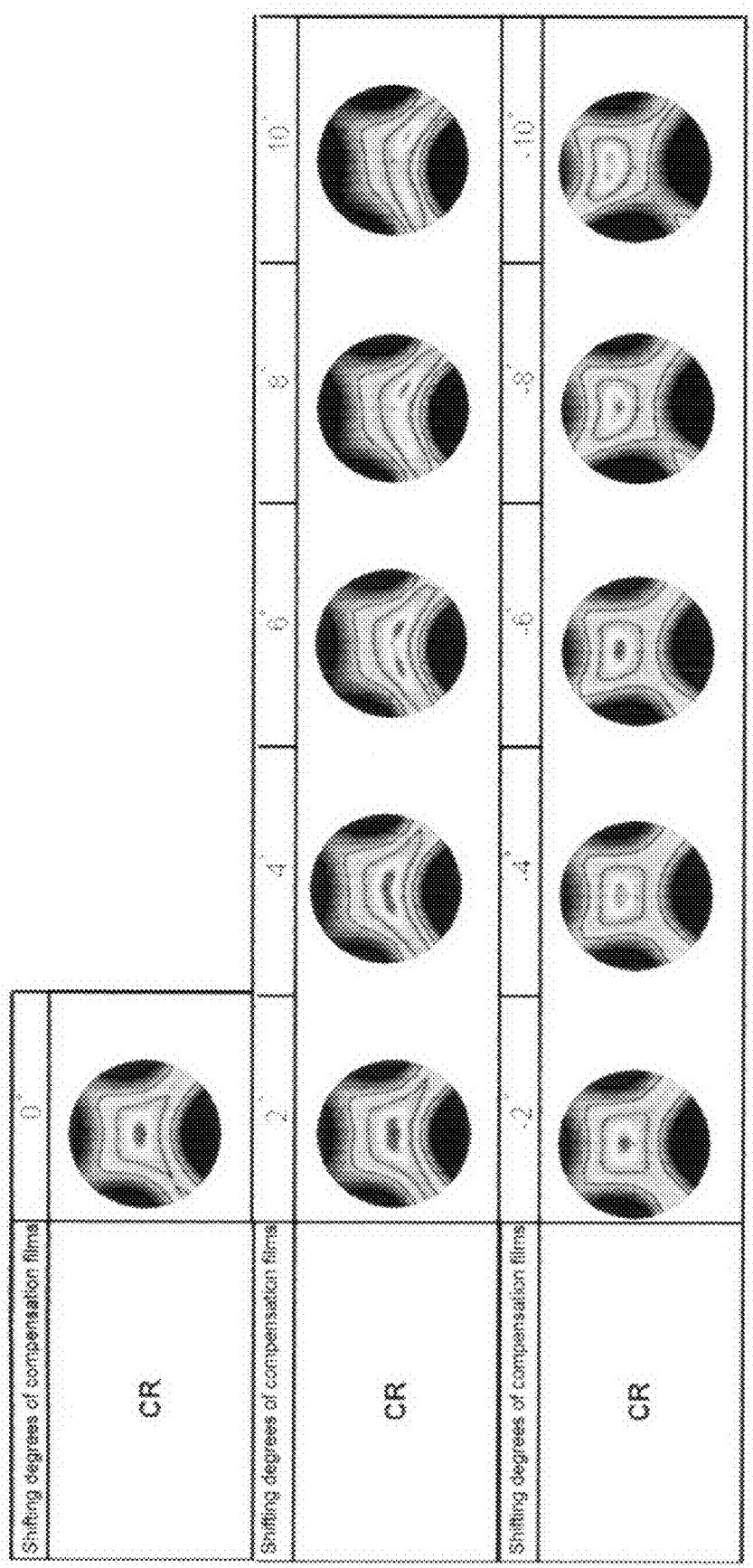
FIG. 4 is a schematic view illustrating results of an optical simulation on correlations between display effects and shifting degrees of compensation films.

In manufacturing processes, compensation films are frequently attached for improving display performance. There are various types of compensation films including the wide-view film of the present embodiment. Correlations between display effects and orthogonal angles at which the compensation films are attached are elaborated by way of simulation results indicated in the following figure. FIG. 4 is a schematic view illustrating results of an optical simulation on correlations between display effects and shifting degrees of compensation films. Referring to FIG. 4, when the compensation films are perpendicular to each other, i.e., when an orthogonal angle included by two compensation films is about ±90°, the corresponding shifting degree indicated in FIG. 4 is 0°. Simulated shifting degrees shown in FIG. 4 are about 0°, about ±2°, about ±4°, about ±6°, about ±8°, and about ±10°, respectively. As depicted in FIG. 4, when the shifting degree is about 0°, the extremely symmetrical image distribution generated by way of optical simulation represents favorable CR. Besides, when the shifting degree is about ±4° and about 0°, a difference between the corresponding CRs is not significant. That is to say, as long as the orthogonal angle included by two compensation films is substantially ±90°±4°, i.e., the two compensation films are substantially perpendicular to each other as indicated in the present embodiment, inaccuracy caused thereby is acceptable.

In light of the foregoing, the first TN liquid crystal layer and the second TN liquid crystal layer have substantially opposite chiralities in the present invention. Moreover, the transmission axis of the first polarizer is substantially perpendicular to the transmission axis of the second polarizer in the LCD panel, and the transmission axis of the third polarizer is substantially perpendicular to the transmission axis of the fourth polarizer in the switchable barrier. As such, the switchable 2D/3D display of the present invention has favorable display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A switchable two dimensional/three dimensional (2D/3D) display, comprising:
    a liquid crystal display panel, comprising:
        a first substrate and a second substrate opposite to the first substrate;
        a first twisted nematic liquid crystal layer, disposed between the first substrate and the second substrate;
        a first wide-view film set, comprising a first wide-view film and a second wide-view film, the first wide-view film being disposed on an outer surface of the first substrate, the second wide-view film being disposed on an outer surface of the second substrate;
        a first polarizer set, comprising a first polarizer and a second polarizer, the first polarizer set being disposed on the first wide-view film set, such that the first wide-view film is disposed between the first polarizer and the first substrate, and the second wide-view film is disposed between the second polarizer and the second substrate, a transmission axis of the first polarizer and a transmission axis of the second polarizer being substantially perpendicular to each other;
    a switchable barrier, comprising:
        a third substrate and a fourth substrate opposite to the third substrate;
        a second twisted nematic liquid crystal layer, disposed between the third substrate and the fourth substrate, wherein the second twisted nematic liquid crystal layer and the first twisted nematic liquid crystal layer have opposite chiralities;
        a second wide-view film set, comprising a third wide-view film and a fourth wide-view film, the third wide-view film being disposed on an outer surface of the third substrate, the fourth wide-view film being disposed on an outer surface of the fourth substrate; and
        a second polarizer set, comprising a third polarizer and a fourth polarizer, the second polarizer set being disposed on the second wide-view film set, such that the third wide-view film is disposed between the third polarizer and the third substrate, and the fourth wide-view film is disposed between the fourth polarizer and the fourth substrate, a transmission axis of the third polarizer and a transmission axis of the fourth polarizer being substantially perpendicular to each other.

2. The switchable 2D/3D display of claim 1, the liquid crystal display panel further comprising a first alignment film set having a first alignment film and a second alignment film, the first alignment film being disposed on an inner surface of the first substrate and located between the first substrate and the first twisted nematic liquid crystal layer, the second alignment film being disposed on an inner surface of the second substrate and located between the second substrate and the first twisted nematic liquid crystal layer, wherein a rubbing direction of the first alignment film and a rubbing direction of the second alignment film are substantially perpendicular to each other.

3. The switchable 2D/3D display of claim 2, wherein the rubbing direction of the first alignment film in the liquid crystal display panel is substantially perpendicular to the transmission axis of the first polarizer, or the rubbing direction of the second alignment film in the liquid crystal display panel is substantially perpendicular to the transmission axis of the second polarizer.

4. The switchable 2D/3D display of claim 2, the switchable barrier further comprising a second alignment film set having a third alignment film and a fourth alignment film, the third alignment film being disposed on an inner surface of the third substrate and located between the third substrate and the second twisted nematic liquid crystal layer, the fourth alignment film being disposed on an inner surface of the fourth substrate and located between the fourth substrate and the second twisted nematic liquid crystal layer, wherein a rubbing direction of the third alignment film and a rubbing direction of the fourth alignment film are substantially perpendicular to each other.

5. The switchable 2D/3D display of claim 4, wherein the rubbing direction of the third alignment film in the switchable barrier is substantially perpendicular to the transmission axis of the third polarizer, or the rubbing direction of the fourth alignment film in the switchable barrier is substantially perpendicular to the transmission axis of the fourth polarizer.

6. The switchable 2D/3D display of claim 1, wherein the transmission axis of the second polarizer and the transmission axis of the third polarizer are substantially parallel to each other.

7. The switchable 2D/3D display of claim 1, wherein the transmission axis of the fourth polarizer and the transmission axis of the first polarizer are substantially parallel to each other.

8. The switchable 2D/3D display of claim 4, wherein a rubbing direction of the second alignment film and a rubbing direction of the third alignment film are substantially parallel to each other.

9. The switchable 2D/3D display of claim 4, wherein a rubbing direction of the fourth alignment film and a rubbing direction of the first alignment film are substantially parallel to each other.

* * * * *